US011521220B2

(12) United States Patent
Trim et al.

(10) Patent No.: US 11,521,220 B2
(45) Date of Patent: Dec. 6, 2022

(54) GENERATING CLASSIFICATION AND REGRESSION TREE FROM IOT DATA

(71) Applicant: International Business Machines Corporation, Armonk, NY (US)

(72) Inventors: Craig M. Trim, Ventura, CA (US); Michael Bender, Rye Brook, NY (US); Martin G. Keen, Cary, NC (US); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 16/432,363

(22) Filed: Jun. 5, 2019

(65) Prior Publication Data
US 2020/0387917 A1 Dec. 10, 2020

(51) Int. Cl.
| G06N 20/00 | (2019.01) |
| G06N 5/04 | (2006.01) |
| G16Y 20/40 | (2020.01) |
| G16Y 40/20 | (2020.01) |
| G06Q 30/02 | (2012.01) |

(52) U.S. Cl.
CPC ......... *G06Q 30/0203* (2013.01); *G06N 5/045* (2013.01); *G06N 20/00* (2019.01); *G16Y 20/40* (2020.01); *G16Y 40/20* (2020.01)

(58) Field of Classification Search
CPC .... G06Q 30/0203; G06N 20/00; G06N 5/045; G06N 5/003; G16Y 20/40; G16Y 40/20
See application file for complete search history.

(56) References Cited

U.S. PATENT DOCUMENTS

| 5,864,839 A | 1/1999 | Bourgoin |
| 6,269,353 B1 | 7/2001 | Sethi |
| 2005/0080462 A1 | 4/2005 | Jenkins |
| 2006/0122834 A1 | 6/2006 | Bennett |
| 2009/0025023 A1 | 1/2009 | Pradeep |
| 2010/0094560 A1 | 4/2010 | Lois |
| 2010/0169106 A1 | 7/2010 | Powers |

(Continued)

FOREIGN PATENT DOCUMENTS

JP 2014081913 A 5/2014

OTHER PUBLICATIONS

P. Spoletini, et al., "Empowering Requirements Elicitation Interviews with Vocal and Biofeedback Analysis," 2016 IEEE 24th International Requirements Engineering Conference (RE), Beijing, 2016, pp. 371-376.

(Continued)

*Primary Examiner* — Soe Hlaing
(74) *Attorney, Agent, or Firm* — Stephanie L. Carusillo

(57) ABSTRACT

In an approach for monitoring data usage in an IoT network, a processor identifies a set of IoT devices. A processor collects a set of baseline readings for the set of IoT devices. A processor collects a set of IoT data from the set of IoT devices as a user answers a survey question. A processor compares the set of baseline readings to the set of IoT data. A processor derives an emotional state of the user while answering the survey question. A processor builds a CART model using the set of baseline readings, the set of IoT data, and a set of survey data. A processor applies the emotional state as a weight to the CART model. A processor outputs the weighted CART model.

20 Claims, 3 Drawing Sheets

(56) References Cited

U.S. PATENT DOCUMENTS

| | | | |
|---|---|---|---|
| 2013/0085808 | A1 | 4/2013 | Forbes |
| 2015/0178756 | A1 | 6/2015 | Chao |
| 2016/0022193 | A1 | 1/2016 | Rau |
| 2017/0308903 | A1 | 10/2017 | Agranonik |
| 2018/0315063 | A1 | 11/2018 | Cheesman |
| 2019/0110728 | A1* | 4/2019 | Sbodio ............... G09B 7/00 |
| 2019/0209022 | A1* | 7/2019 | Sobol ............... A61B 5/0022 |
| 2019/0232974 | A1* | 8/2019 | Reiley ............... G06V 20/597 |

OTHER PUBLICATIONS

Anonymous, "Method of Real-Time Social Polling Service Based on Inputs of Biometrics." 5 pps., IP.com Disclosure No. IPCOM000243451D, Electronic Publication Date: Sep. 22, 2015.

Disclosed Anonymously, "Using Customer Support Interaction Data to Estimate Customer Satisfaction", An IP.com Prior Art Database Technical Disclosure, IP.com No. IPCOM000252343D, IP.com Electronic Publication Date: Jan. 5, 2018, 34 pages.

Ganassali, et al., "Assessing visual survey protocols to capture brand-related emotional insights", emerald insight, vol. 21, Issue 1, Accepted: Mar. 22, 2017, <https://www.emeraldinsight.com/doi/abs/10.1108/QMR-09-2016-0080>.

Harmon-Jones, et al., "The Discrete Emotions Questionnaire: A New Tool for Measuring State Self-Reported Emotions", Published: Aug. 8, 2016, <https://journals.plos.org/plosone/article?id=10.1371/journal.pone.0159915>.

Magids, et al., "The New Science of Customer Emotions", From the Nov. 2015 Issue, 16 pps., Harvard Business Review, <hthttps://hbr.org/2015/11/the-new-science-of-customer-emotions>.

Schmidt, Maxie, "Measure Emotions in Customer Experiences to Improve Loyalty", 6 pps., Mar. 9, 2016, 17 pps., copyright 2019 Forrester Research, Inc., <https://go.forrester.com/blogs/16-03-09-measure_emotions_in_customer_experiences_to_improve_loyalty/>.

Schut, et al., "Biometrics for Emotion Detection (BED): Exploring the combination of Speech and ECG", Human Media Interaction, Faculty of Electrical Engineering, Mathematics & Computer Science, University of Twente, <http://doc.utwente.nl/72490/1/BED_final2r.pdf>.

\* cited by examiner

GENERATING CLASSIFICATION AND REGRESSION TREE FROM IOT DATA

BACKGROUND

The present invention relates generally to the field of prediction models, and more particularly to generating classification and regression trees using Internet of Things (IoT) device data.

Surveys are used to research human subjects using a list of questions aimed at extracting specific data from a particular group of people. Surveys may be conducted by phone, mail, via the Internet, or face-to-face. Survey research is often used to assess thoughts, opinions, and feelings. Surveys can be specific and limited, or can have more global, widespread goals. Psychologists and sociologists often use surveys to analyze behavior. More pragmatically, surveys are used by public health officials, professional organizations, advertising and marketing directors, and the media in evaluating political candidates.

Classification and regression trees (CARTs) are machine-learning methods for constructing prediction models from data. The models are obtained by recursively partitioning the data space and fitting a simple prediction model within each partition. As a result, the partitioning can be represented graphically as a decision tree. Classification trees are designed for dependent variables that take a finite number of unordered values, with prediction error measured in terms of misclassification cost. Regression trees are for dependent variables that take continuous or ordered discrete values, with prediction error typically measured by the squared difference between the observed and predicted values.

Internet of Things (IoT) refers to the concept of extending internet connectivity beyond conventional computing platforms such as personal computers and mobile devices, and into any range of traditionally non-internet-enabled physical devices and everyday objects. Embedded with electronics, internet connectivity, and other forms of hardware (such as sensors), these devices and objects can communicate and interact with others over the Internet, and the devices and objects can be remotely monitored and controlled.

SUMMARY

Aspects of an embodiment of the present invention disclose a method, computer program product, and computer system for generating CART model using IoT data. A processor identifies a set of IoT devices. A processor collects a set of baseline readings for the set of IoT devices. A processor collects a set of IoT data from the set of IoT devices as a user answers a survey question. A processor compares the set of baseline readings to the set of IoT data. A processor derives an emotional state of the user while answering the survey question. A processor builds a CART model using the set of baseline readings, the set of IoT data, and a set of survey data. A processor applies the emotional state as a weight to the CART model. A processor outputs the weighted CART model.

DETAILED DESCRIPTION

Figure 1:
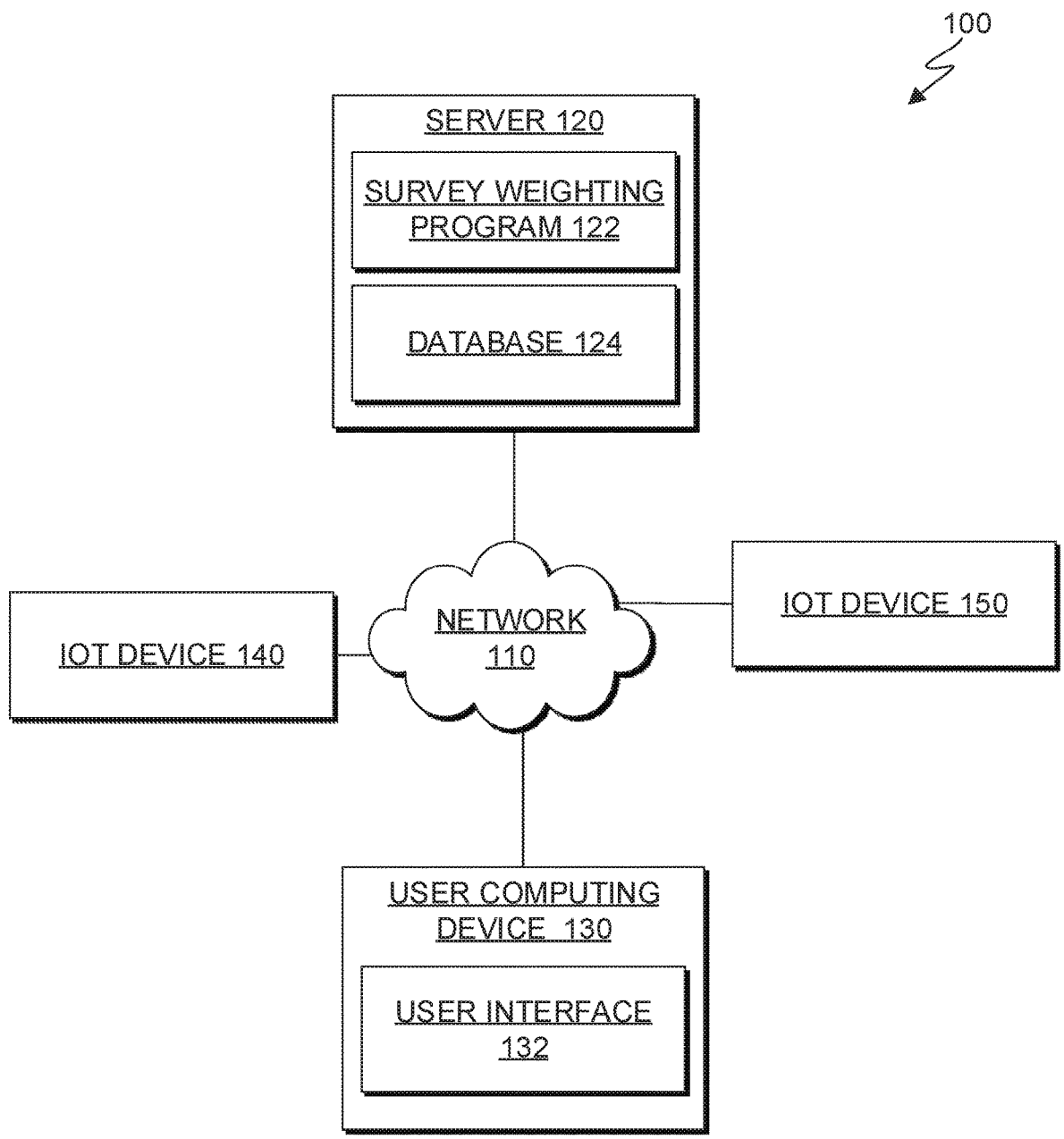
FIG. 1 depicts a block diagram of a computing environment, in accordance with an embodiment of the present invention.

Embodiments of the present invention recognize that a key factor in evaluating survey data is in determining how much weight to assign to a given attribute. Survey data can be used to evaluate various levels of service quality such as event participation, ride sharing experience, passenger air travel satisfaction, etc. Weighting of survey data attribution is typically reliant on simple statistical methods, such as direct questions in customer satisfaction surveys. These weightings leverage statistical regression analysis to infer attribute importance. Embodiments of the present invention recognize that these statistical methods present flaws by always assuming pre-defined and underlying relationships between independent and dependent variables. Violations of these assumptions lead to incorrect estimations.

Embodiments of the present invention provide a method that extends classification and regression tree (CART) models with Internet of Thing (IoT) devices to automatically build CART models from captured IoT data to more accurately reflect survey attributes. Embodiments of the present invention provide a system that derives an emotional state of a user while answering survey questions through IoT data captured by IoT devices. Embodiments of the present invention provide a system that combines survey attribute data assembled in a CART with a weighting assigned based on the emotional state of a user answering a given question. Embodiments of the present invention further provide leaf node pruning of a CART through a hold-out test utilizing emotional state data.

IoT data includes, but is not limited to, baseline reading data, biometric data, and environmental and situational data. Baseline reading data includes, but is not limited to, baseline readings from IoT devices of biometric data and environmental/situational data associated with the user at the time the user begins a survey. For example, environmental data from a camera and microphone of surveillance camera, such as IoT device 150, and biometric data from a smart watch, such as IoT device 140, at the time the user begins a survey. Biometric data includes, but is not limited to, heart rate, skin temperature, sweat level, eye/retina focus, facial expression, user activity or movement level, speech speed, and voice tone. Environmental/situational data includes, but is not limited to, background activity, background noise, a user's location, time of day, etc.

It should be noted herein that in the described embodiments, all participating parties have consented to being recorded and monitored, and all participating parties are aware of the potential that such recording and monitoring may be taking place. In various embodiments, for example, when downloading or operating a program of the system described, the program presents a terms and conditions prompt enabling the user to opt-in or opt-out of participation. These embodiments may also include periodic reminders of such recording and monitoring throughout the course of any such use. Certain embodiments may also include regular (e.g. daily, weekly, monthly) reminders to the participating parties that they have consented to being recorded and monitored for survey data purposes and may provide the participating parties with the opportunity to opt-out of such recording and monitoring if desired.

The present invention will now be described in detail with reference to the Figures.

FIG. 1 depicts a functional block diagram illustrating computing environment 100, in accordance with an embodiment of the present invention. FIG. 1 provides only an illustration of one embodiment of the present invention and does not imply any limitations with regard to the environments in which different embodiments may be implemented. In the depicted embodiment, computing environment 100 includes user computing device 130, server 120, IoT device 140, and IoT device 150 interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between user computing device 110, server 120, IoT device 140, and IoT device 150. Computing environment 100 may include additional servers, computers, IoT devices, or other devices not shown.

Server 120 operates to run survey weighting program 122 and store and/or send data using database 124. In an embodiment, server 120 can send data from database 124 to user computing device 130, IoT device 140, and/or IoT device 150. In an embodiment, server 120 can receive data in database 124 from user computing device 130, IoT device 140, and/or IoT device 150. In some embodiments, server 120 may be a management server, a web server, or any other electronic device or computing system capable of receiving and sending data. In some embodiments, server 120 may be a laptop computer, tablet computer, netbook computer, personal computer (PC), a desktop computer, a smart phone, or any programmable electronic device capable of communicating with user computer device 130, IoT device 140, and IoT device 150 via network 110. In other embodiments, server 120 represents a server computing system utilizing multiple computers as a server system, such as in a cloud computing environment. Server 120 may include components as described in further detail in FIG. 3.

User computing device 130 operates to run user interface 132 through which a user can complete a survey. In an embodiment, user computing device 130 can send and/or receive data from server 120. In some embodiments, user computing device 130 may be a management server, a web server, or any other electronic device or computing system capable of receiving and sending data. In some embodiments, user computing device 130 may be a laptop computer, tablet computer, netbook computer, personal computer (PC), a desktop computer, a smart phone, or any programmable electronic device capable of communicating with server 120 via network 110. User computing device 130 may include components as described in further detail in FIG. 3.

User interface 132 operates as a local user interface on computing device 130 through which a user can complete a survey. In an embodiment, user interface 132 is a local mobile application user interface of survey weighting program 122. In an embodiment, user interface 132 enables a user of network 110 to answer questions to a survey presented to the user through user interface 132.

Survey weighting program 122 operates as a program for determining weights for survey attributes by collecting IoT data from an IoT device, such as IoT device 140, deriving an emotional state for each survey answer, and building a CART model using the emotional state. In the depicted embodiment, survey weighting program 122 resides on server 120. In other embodiments, survey weighting program 122 may reside on user computing device 130, or another computing device (not shown), provided that survey weighting program 122 has access to network 110.

Database 124 operates as a repository for IoT data captured by an IoT device while a user is completing a survey. IoT data includes, but is not limited to, baseline reading data, biometric data, and environmental/situational data. Database 124 can be implemented with any type of storage device capable of storing data and configuration files that can be accessed and utilized by server 120, such as a database server, a hard disk drive, or a flash memory. In an embodiment, database 124 is accessed by survey weighting program 122, server 120, and/or user computing device 130 to store baseline reading data, biometric data, and environmental/situational data. In another embodiment, database 124 is accessed by survey weighting program 122, server 120, and/or user computing device 130 to access the baseline reading data, biometric data, and environmental/situational data. In the depicted embodiment, database 124 resides on server 120. In another embodiment, database 124 may reside elsewhere within computing environment 100 provided database 124 has access to network 110.

IoT devices 140 and 150 operate as a physical devices and/or everyday objects that are embedded with electronics, Internet connectivity, and other forms of hardware (i.e., sensors). In general, IoT devices can communicate and interact with other IoT devices over the Internet while being remotely monitored and controlled. In an embodiment, IoT devices 140 and 150 can be controlled by survey weighting program 122 to collect and send IoT data to survey weighting program 122 while a user of user computing device 130 is completing a survey. IoT data collected by IoT devices of computing environment 100 includes, but is not limited to, baseline reading data, biometric data, and environmental/situational data. Types of IoT devices include, but are not limited to, smart locks, garage doors, refrigerators, freezers, ovens, mobile devices, smart watches, A/C units, washer/dryer units, smart TVs, virtual assistance devices, surveillance cameras, and any other smart devices. In several embodiments, computing environment 100 contains additional IoT devices (not shown).

Figure 2:
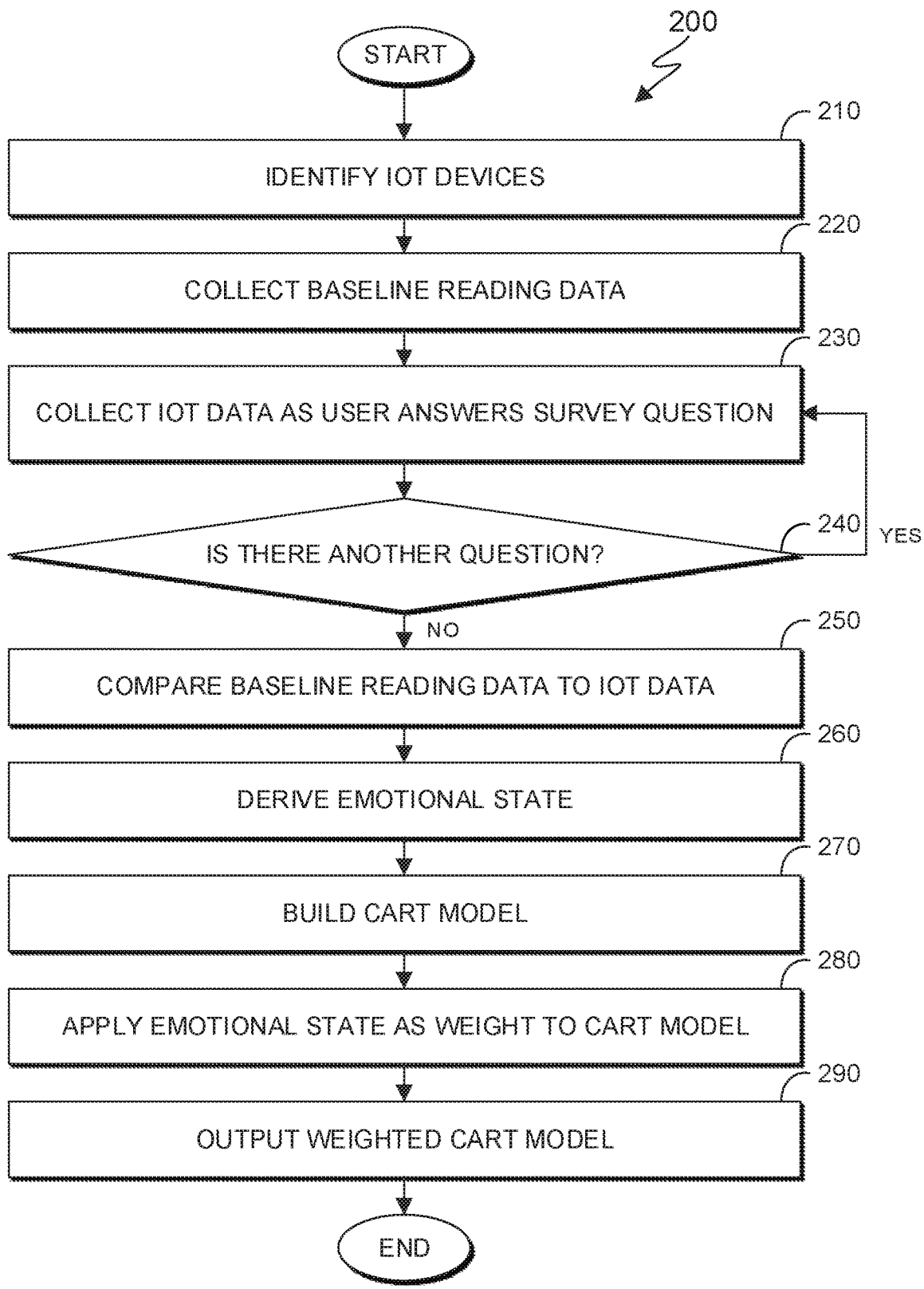
FIG. 2 depicts a flow chart of the steps of a survey weighting program, in accordance with an embodiment of the present invention.

FIG. 2 depicts a flowchart 200 of the steps of survey weighting program 122, in accordance with an embodiment of the present invention. In an embodiment, survey weighting program 122 determines weights for survey attributes by collecting IoT data from an IoT device, such as IoT device 140, deriving an emotional state for each survey answer, and building a CART model using the emotional states. In an embodiment, survey weighting program 122 initiates when a user of user computing device 130 begins a survey through user interface 132. It should be appreciated that the process depicted in FIG. 2 illustrates one possible iteration of the process flow, which repeats for each survey begun by a user of user computing device 130.

In step 210, survey weighting program 122 identifies IoT devices associated with the user. IoT devices associated with the user can include IoT devices physically worn by the user (i.e., a smart watch), IoT devices registered or owned by the user (i.e., a smart phone), IoT devices with the user in range or view (i.e., a surveillance camera, virtual assistant). In an embodiment, survey weighting program 122 identifies IoT device 140 and IoT device 150 as the IoT devices that can collect IoT data associated with the user. For example, IoT device 140 is a smart watch worn by the user and IoT device 150 is a surveillance camera near the user. In some embodiments, survey weighting program 122 identifies user computing device 130 as an IoT device, such as a smart phone, that can collect IoT data, for example, through a camera and/or microphone.

In step 220, survey weighting program 122 collects baseline reading data from the identified IoT devices. In an embodiment, survey weighting program 122 collects baseline readings of biometrics and environmental/situational data from the identified IoT devices. In an embodiment, survey weighting program 122 collects baseline reading data from IoT device 140 and IoT device 150. In an embodiment, survey weighting program 122 collects baseline reading data from user computing device 130. For example, survey weighting program 122 collects baseline readings for heart rate and skin temperature from IoT device 140, a smart watch, collects baseline readings for facial expression and activity or movement level from IoT device 150, a surveillance camera, and collects baseline readings for speech speed and voice tone from a microphone in user computer device 140, a smart phone. In an embodiment, survey weighting program 122 stores the collected baseline reading data in database 124.

In step 230, survey weighting program 122 collects IoT data from the identified IoT devices as the user answers a survey question. In an embodiment, survey weighting program 122 collects IoT data from IoT device 140 and IoT device 150 as the user of user computing device 130 answers a survey question through user interface 132. In an embodiment, survey weighting program 122 collects IoT data from user computing device 130 as the user of user computing device 130 answers a survey question through user interface 132. Survey weighting program 122 collects IoT data from the time the user is presented the survey question to the time the user selects a survey answer to that survey question. For example, survey weighting program 122 collects IoT data updates for heart rate and skin temperature from IoT device 140, a smart watch, for facial expression and activity or movement level from IoT device 150, a surveillance camera, and for speech speed and voice tone from a microphone in user computer device 140, a smart phone. In an embodiment, survey weighting program 122 stores the collected IoT data for a survey question in database 124.

In decision 240, survey weighting program 122 determines whether there is another survey question. In an embodiment, survey weighting program 122 determines whether there is another survey question based on if another survey question is presented to the user through user interface 132 on user computing device 130. If survey weighting program 122 determines there is another survey question (decision 240, YES branch), then survey weighting program 122 proceeds back to step 230. If survey weighting program 122 determines there is not another survey question (decision 240, NO branch), then survey weighting program 122 proceeds to step 250 to begin post-survey processing.

In step 250, survey weighting program 122 compares the baseline reading data to the IoT data collected for each survey question. In an embodiment, survey weighting program 122 compares the baseline reading data to the IoT data collected from each identified IoT device for each survey question and calculates a variance. For example, survey weighting program 122 compares the baseline reading data for heart rate and skin temperature to the IoT data updates for heart rate and skin temperature during a first survey question to calculate a heart rate variance and skin temperature variance while answering the first survey question. In another example, survey weighting program 122 compares the baseline reading data for facial expression and activity or movement level to the IoT data updates for facial expression and activity or movement level during a first survey question to calculate a facial expression variance and activity or movement level variance while answering the first survey question. In another example, survey weighting program 122 compares the baseline reading data for speech speed and voice tone to the IoT data updates for speech speed and voice tone during a first survey question to calculate a speech speed variance and voice tone variance while answering the first survey question.

In step 260, survey weighting program 122 derives an emotional state of the user for each survey question. In an embodiment, survey weighting program 122 derives an emotional state of the user for each survey question based, at least in part, on the variances calculated for the biometric and environmental/situational data collected. In an embodiment, survey weighting program 122 uses biometrics for emotion detection (BED) methods to derive an emotional state of the user for each survey question in which there was biometric data variances, such as a heart rate variance. BED methods use a combination of heart rate variances and speech, more specifically a variability of the fundamental frequency, energy of speech, and intensity of air pressure, to derive an emotional state. In an embodiment, survey weighting program 122 uses visual and oral cognitive classification to derive an emotional state of the user for each survey question in which there was a facial expression variance. In an embodiment, survey weighting program 122 uses a combination of BED methods and visual and oral cognitive classification to derive an emotional state of the user. In an embodiment, survey weighting program 122 stores the derived emotional state of the user for each survey question in database 124.

In step 270, survey weighting program 122 builds a CART model. In an embodiment, survey weighting program 122 builds a CART model based on survey data and the IoT data captured for all the survey questions answered by the user. Survey data can comprise the survey questions and the user's answers. In another embodiment, survey weighting program 122 builds a CART model based on the IoT data captured for each survey question answered by the user. In an embodiment, survey weighting program 122 builds a CART model using the IoT data captured and the emotional states of the user as input variables.

In an embodiment, survey weighting program 122 defines (e.g., through machine-learning) survey attributes based on the survey questions, derived emotional states, and/or the input variables (e.g., the IoT data collected and the emotional states derived). In an embodiment, a survey attribute can describe one or more survey questions (e.g., demographic questions or client satisfaction questions). In an embodiment, a survey attribute can describe an emotional state. In another embodiment, survey weighting program 122 uses pre-defined survey attributes input through user interface 132 on user computing device 130. In yet another embodiment, survey weighting program 122 uses pre-defined survey attributes received on server 120 and stored in database 124. In an embodiment, survey weighting program 122 builds a CART model with each survey attribute representing a leaf in the CART model.

In step 280, survey weighting program 122 applies the derived emotional states as weights to the CART model. In an embodiment, survey weighting program 122 applies the derived emotional states to the respective survey attributes through recursive binary splitting. In an embodiment, survey weighting program 122 applies a weight based on the level of emotional state (e.g., strong emotional response to no emotional response) with a higher weight being given to a strong emotional response and lower weight being given to a weaker emotional response.

In step 290, survey weighting program 122 outputs the weighted CART model. In an embodiment, survey weighting program 122 outputs the weighted CART model to user computing device 130 to be presented to a user through user interface 132. In an embodiment, survey weighting program 122 outputs the weighted CART model to a user interface of server 120 (not shown). In an embodiment, survey weighting program 122 outputs the weighted CART model to database 124 to store. In an embodiment, survey weighting program 122 outputs the weighted CART model to another computing device (not shown) via network 110.

Figure 3:
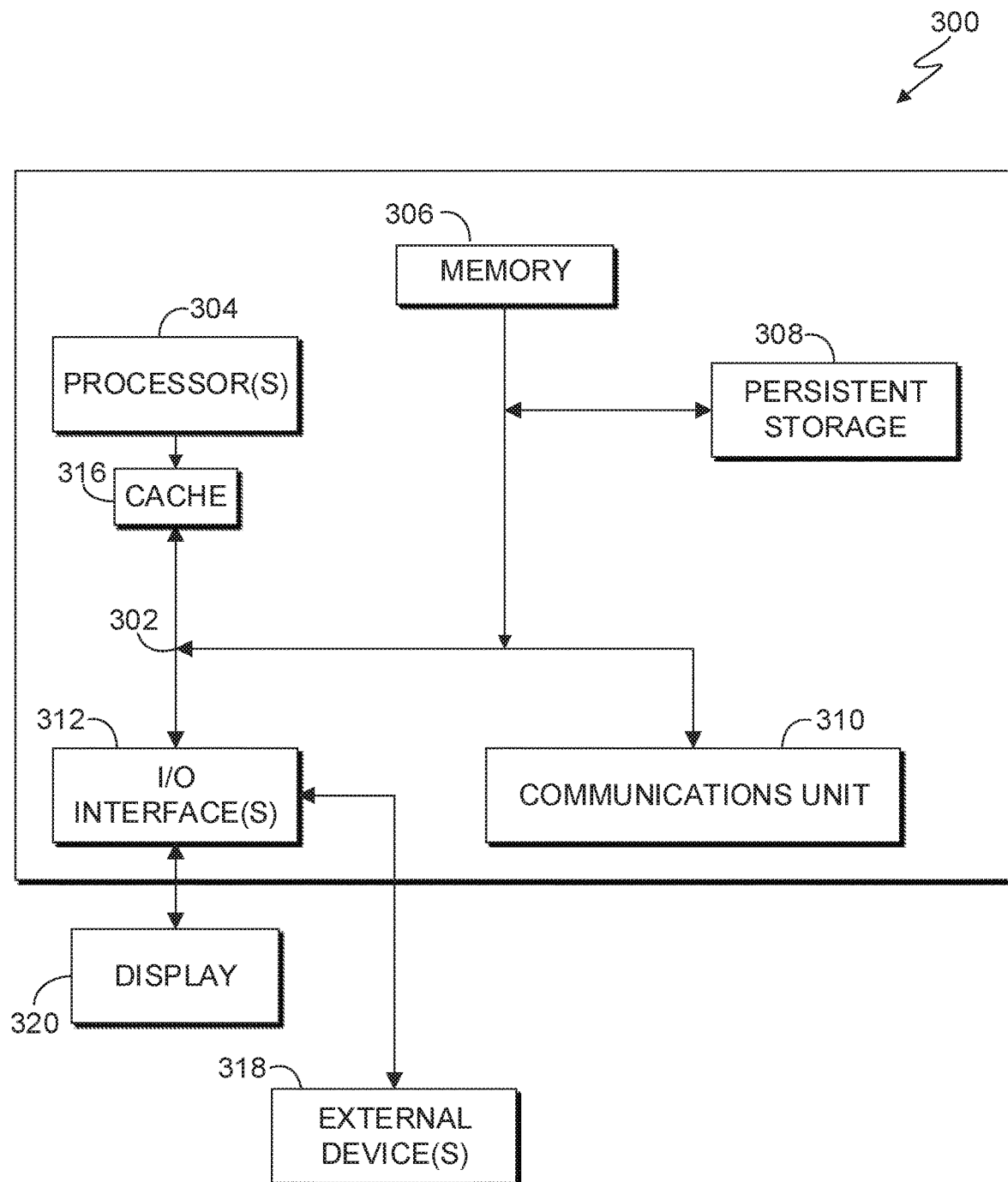
FIG. 3 depicts a block diagram of a computing device of computing environment, in accordance with an embodiment of the present invention.

FIG. 3 depicts a block diagram of computer 300 suitable for server 120 and user computing device 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Survey weighting program 122 may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs, such as survey weighting program 122, may be downloaded to persistent storage 308 through communications unit 310.

I/O interface(s) 312 allows for input and output of data with other devices that may be connected to user computing device 130 and server 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Survey weighting program 122 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating a classification and regression tree (CART) model using Internet of things (IoT) data, the computer-implemented method comprising:
   identifying, by one or more processors, a set of IoT devices;
   collecting, by one or more processors, a set of baseline readings for the set of IoT devices;
   collecting, by one or more processors, a set of IoT data from the set of IoT devices as a user answers a survey question;
   comparing, by one or more processors, the set of baseline readings to the set of IoT data;
   deriving, by one or more processors, an emotional state of the user while answering the survey question;
   building, by one or more processors, a CART model using the set of baseline readings, the set of IoT data, and a set of survey data;
   applying, by one or more processors, the emotional state as a weight to the CART model; and
   outputting, by one or more processors, the weighted CART model.

2. The computer-implemented method of claim 1, wherein the set of IoT devices are associated with the user.

3. The computer-implemented method of claim 1, wherein the set of IoT data comprises biometric, environmental, and situational data from the set of IoT devices.

4. The computer-implemented method of claim 1, wherein as the user answers the survey question comprises from a first time the user is presented the survey question to a second time the user selects a survey answer to the survey question.

5. The computer-implemented method of claim 1, wherein comparing the set of baseline readings to the set of IoT data comprises calculating, by one or more processors, a set of variances for each baseline reading and a respective IoT data.

6. The computer-implemented method of claim 5, wherein deriving the emotional state of the user is based on the set of variances.

7. The computer-implemented method of claim 1, wherein deriving the emotional state of the user comprises using at least one of biometrics for emotion detection method and visual and oral cognitive classification.

8. A computer program product for generating a classification and regression tree (CART) model using Internet of things (IoT) data, the computer program product comprising:
one or more computer readable storage media and program instructions stored on the one or more computer readable storage media, the program instructions comprising:
program instructions to identify a set of IoT devices;
program instructions to collect a set of baseline readings for the set of IoT devices;
program instructions to collect a set of IoT data from the set of IoT devices as a user answers a survey question;
program instructions to compare the set of baseline readings to the set of IoT data;
program instructions to derive an emotional state of the user while answering the survey question;
program instructions to build a CART model using the set of baseline readings, the set of IoT data, and a set of survey data;
program instructions to apply the emotional state as a weight to the CART model; and
program instructions to output the weighted CART model.

9. The computer program product of claim 8, wherein the set of IoT devices are associated with the user.

10. The computer program product of claim 8, wherein the set of IoT data comprises biometric, environmental, and situational data from the set of IoT devices.

11. The computer program product of claim 8, wherein as the user answers the survey question comprises from a first time the user is presented the survey question to a second time the user selects a survey answer to the survey question.

12. The computer program product of claim 8, wherein the program instructions to compare the set of baseline readings to the set of IoT data comprises program instructions to calculate a set of variances for each baseline reading and a respective IoT data.

13. The computer program product of claim 12, wherein the program instructions to derive the emotional state of the user is based on the set of variances.

14. The computer program product of claim 8, wherein the program instructions to derive the emotional state of the user comprises using at least one of biometrics for emotion detection method and visual and oral cognitive classification.

15. A computer system for generating a classification and regression tree (CART) model using Internet of things (IoT) data, the computer system comprising:
one or more computer processors;
one or more computer readable storage media;
program instructions stored on the computer readable storage media for execution by at least one of the one or more processors, the program instructions comprising:
program instructions to identify a set of IoT devices;
program instructions to collect a set of baseline readings for the set of IoT devices;
program instructions to collect a set of IoT data from the set of IoT devices as a user answers a survey question;
program instructions to compare the set of baseline readings to the set of IoT data;
program instructions to derive an emotional state of the user while answering the survey question;
program instructions to build a CART model using the set of baseline readings, the set of IoT data, and a set of survey data;
program instructions to apply the emotional state as a weight to the CART model; and
program instructions to output the weighted CART model.

16. The computer system of claim 15, wherein the set of IoT devices are associated with the user.

17. The computer system of claim 15, wherein the set of IoT data comprises biometric, environmental, and situational data from the set of IoT devices.

18. The computer system of claim 15, wherein as the user answers the survey question comprises from a first time the user is presented the survey question to a second time the user selects a survey answer to the survey question.

19. The computer system of claim 15, wherein the program instructions to compare the set of baseline readings to the set of IoT data comprises program instructions to calculate a set of variances for each baseline reading and a respective IoT data.

20. The computer system of claim 19, wherein the program instructions to derive the emotional state of the user is based on the set of variances.

* * * * *